(12) United States Patent
Ushioda et al.

(10) Patent No.: US 6,288,391 B1
(45) Date of Patent: *Sep. 11, 2001

(54) METHOD FOR LOCKING PROBE OF SCANNING PROBE MICROSCOPE

(75) Inventors: Sukekatsu Ushioda; Yoichi Uehara; Keiji Ito, all of Sendai (JP)

(73) Assignee: Tohoku University, Sendai (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/165,355

(22) Filed: Oct. 2, 1998

(30) Foreign Application Priority Data

Mar. 31, 1998 (JP) ................................. 10-085770

(51) Int. Cl.$^7$ ............................. G01N 23/00; G21K 7/00
(52) U.S. Cl. .......................................................... 250/307
(58) Field of Search ................................. 250/307, 201.1, 250/287, 306; 310/316

(56) References Cited

U.S. PATENT DOCUMENTS

| | | | |
|---|---|---|---|
| 4,725,730 | * | 2/1988 | Kato et al. ............................. 250/307 |
| 5,077,473 | * | 12/1991 | Elings et al. .......................... 250/306 |
| 5,107,113 | * | 4/1992 | Robinson ............................... 250/306 |

FOREIGN PATENT DOCUMENTS

| | | |
|---|---|---|
| 5-203443 A | 8/1993 | (JP) . |
| 06068835 A | 3/1994 | (JP) . |

* cited by examiner

*Primary Examiner*—Jack Berman
*Assistant Examiner*—Johnnie L Smith, II
(74) *Attorney, Agent, or Firm*—Venable; Robert J. Frank

(57) ABSTRACT

In a method for locking a probe of a scanning probe microscope at any desired position on a specimen surface plane for any desired time period, after taking a first microscopic image of a specimen surface area including the desired position, the probe is moved into the desired position and a second microscopic image is obtained. After moving the probe to the desired position again, a driving voltage applied to a piezoelectric element for driving the probe is kept unchanged during a given time interval T. At the end of the time period, a third microscopic image is taken. The amount of probe drift during the time interval is derived by comparing the relative positions of the second and third images to the first image, and the driving voltage is controlled in accordance with the thus derived amount of the probe drift such that the probe is moved automatically into the desired position. By repeating the steps n times after keeping the driving voltage unchanged, the probe can be locked at the desired position for a long time period nT.

7 Claims, 4 Drawing Sheets

FIG_1
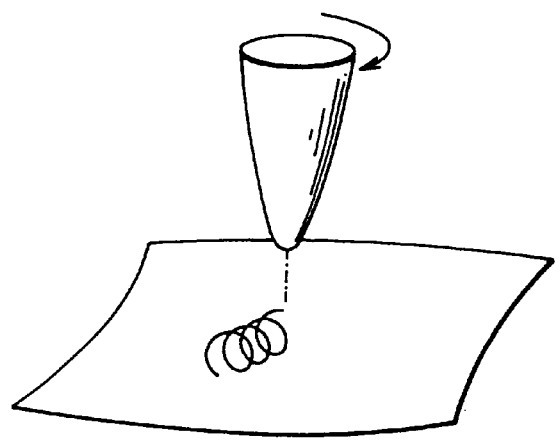
FIG_2
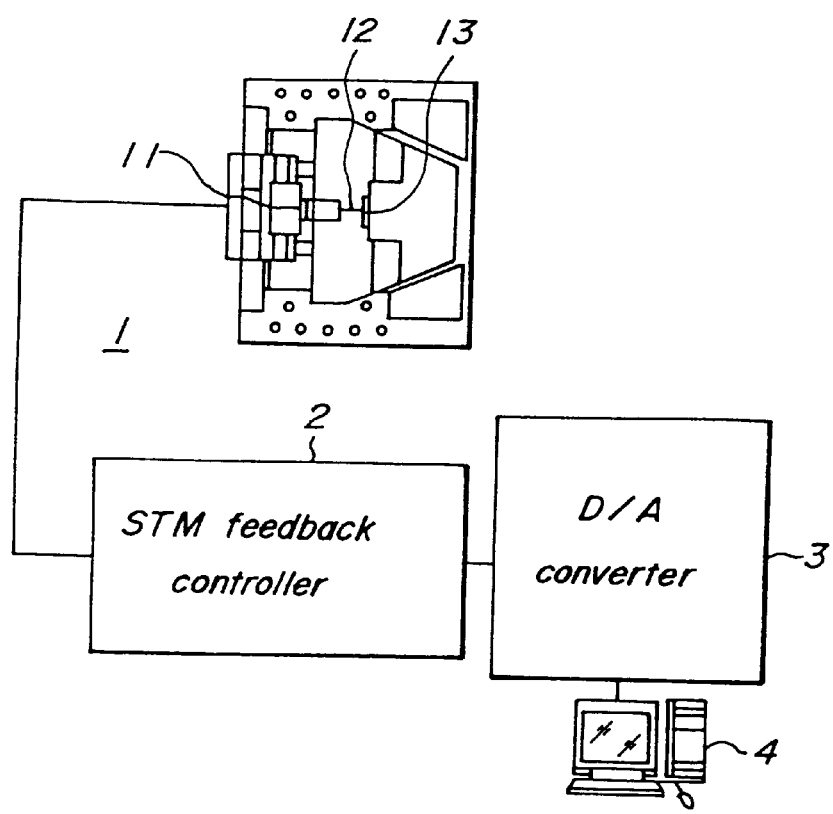

FIG_3
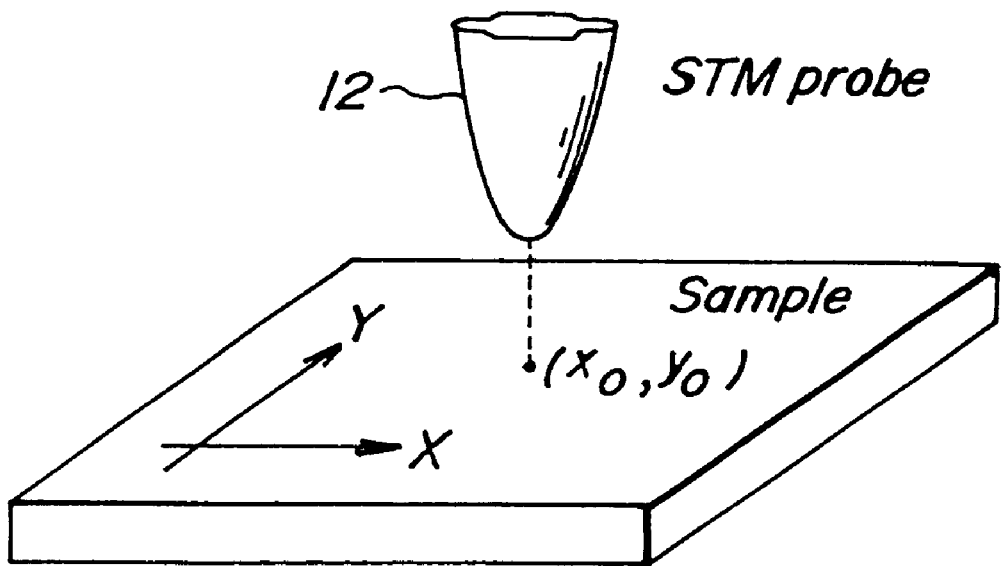

FIG_5
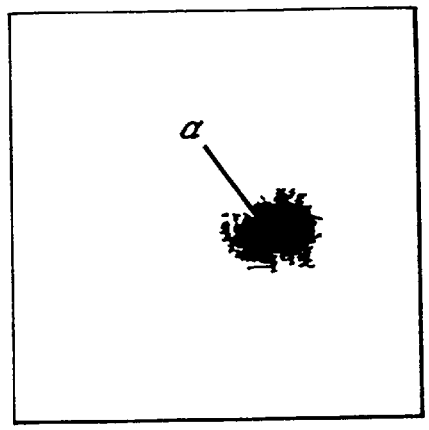
FIG_6
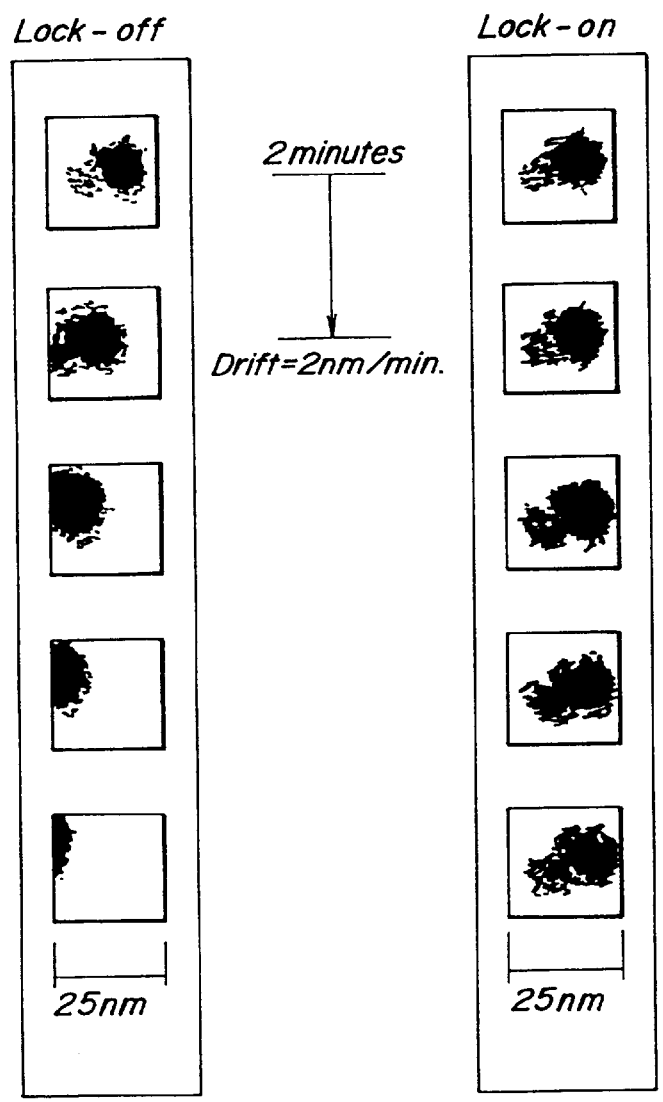

METHOD FOR LOCKING PROBE OF SCANNING PROBE MICROSCOPE

BACKGROUND OF THE INVENTION

1. Field of the invention

The present invention relates to a method for locking a probe of a scanning probe microscope to any desired position on a specimen surface for any desired time period.

2. Related Art Statement

Since a scanning probe microscope, for example a scanning tunneling microscope (STM) can investigate a fine surface structure of solid bodies and can obtain useful information about various characteristics of various materials with an atomic resolution, the scanning probe microscope has been widely used as an essential measuring and analyzing tool not only in the basic research but also in the application research.

The scanning probe microscope utilizes an interaction between a probe and a specimen, said interaction spreading on a two dimensional specimen surface plane over a distance substantially equal to a dimension of one atom. Therefore, by moving the probe into any desired position on the specimen surface plane, information at this position can be obtained.

Usually, the probe secured to a piezo electric element can be moved by applying a voltage to the piezo electric element. Therefore, if the voltage is kept constant, a position of a tip of the probe relative to the specimen surface plane does not change. However, in practice, it is known that a relative position between the probe and the specimen varies in accordance with time. This phenomenon has been known as a thermal drift of the probe. Such a probe drift has been known from the development of the scanning probe microscope. In various applications and research, it is required to lock the probe with respect to the specimen for a relatively long time, but due to the probe drift, the probe could not be fixed or locked to a desired position for a long time. For instance, in the STM light emission spectroscopy in which STM images are analyzed in relation to light emission spectrum, since emitted light is very weak, a quite long time period such as several minutes is required for the analysis. However, the probe tip could not be locked at a desired point for such a long time period.

There have been proposed several solutions for resolving the above mentioned probe drift. For instance, an amount of the probe drift is predicted on the basis of a previously measured probe drift and a driving voltage applied to the piezoelectric element is adjusted on the basis of the predicted amount of the probe drift. However, in practice, since the probe drift does not occur uniformly and an actual probe drift could not be predicted correctly, this known method could not correct the probe drift sufficiently. It is quite likely that the probe drift during the previous measurement differs from the probe drift during an actual inspection.

There has been also proposed another known method for locking the probe. This method is called a tracking tunneling microscopy (TTM) belonging to the STM. A principle of this method will be described with reference to FIG. 1.

FIG. 1 shows diagrammatically the principle of the known TTM. As shown in FIG. 1, according to the TTM, the probe is moved circularly on a specimen surface plane while a tunnel current is measured. During the circular movement of the probe, when the probe traces a locally inclined portion of a specimen, the tunnel current varies because a distance from the probe tip and the actual specimen surface is changed. This variation in the tunnel current is fedback to the driving voltage to be applied to the piezoelectric element such that the probe is moved along the inclined portion of the specimen surface. Finally, the probe reaches a flat portion of the specimen surface, i.e. a top or bottom of the crenellated structure of the specimen surface and is locked at this flat portion, because the tunnel current does not change any more at this flat portion.

It is known that this method can lock the probe with an atomic resolution, but an area at which the probe can be locked is limited to the top or bottom of the crenellated specimen surface structure. Namely, the probe could not be locked at any desired position on the specimen surface plane.

As explained above, there has not been proposed a practically useful method for solving the problem of the probe drift effectively.

SUMMARY OF THE INVENTION

It is an object of the invention to provide a method for locking a probe of a scanning probe microscope at any desired position on a specimen surface plane for any desired time period.

According to the present invention, a method for locking a probe of a scanning probe microscope at any desired position on a specimen surface plane comprises steps of:

(a) taking a first microscopic image of the specimen by moving the probe to scan a scanning area which includes said desired position, (b) moving the probe into said desired position by controlling the driving signal;

(c) taking a second microscopic image of the specimen such that said second microscopic image is contained within said first microscopic image;

(d) computing a relative position of said second microscopic image to said first microscopic image by comparing the first and second microscopic images;

(e) keeping the driving signal unchanged for a given time interval after moving the probe into said desired position;

(f) taking a third microscopic image of the specimen such that said third microscopic image is contained within said first microscopic image;

(g) computing a relative position of said third microscopic image to said first microscopic image by comparing the first and third microscopic images;

(h) computing an amount of a probe drift during said time interval by comparing said relative positions of said second and third microscopic images to said first microscopic image with each other;

(i) controlling the driving signal in accordance with said amount of the probe drift to move the probe into said desired position; and (j) repeating said steps (e) to (i) while comparing successively taken microscopic images with the first microscopic image.

According to the invention, an amount of the probe drift during the time period can be computed by tracking a variation of the microscope image due to the probe drift by comparing successively taken microscopic images, and the probe can be returned into the desired position by controlling the driving signal such that said variation of the microscopic image, i.e. the probe drift can be compensated for. Therefore, the probe of the scanning probe microscope can be kept within a very small area on the specimen surface having a size of nano-meter order or less during a desired time interval. The time interval may be selected to any desired value such that the probe drift during the time interval becomes negligibly small for particular applications. A typical time interval is several seconds.

Moreover, the method according to the invention has an advantage that it can be performed by programming an existing control computer of the scanning probe microscope without adding any special circuit or device.

In a preferable embodiment of the method according to the invention, the microscopic image is taken while said desired position is a center of the image.

BRIEF DESCRIPTION OF THE DRAWINGS

FIG. 1 is a schematic view showing the principle of the known method of locking a probe in TTM;

FIG. 2 is a block diagram illustrating a whole construction of STM in which the method according to the invention is applied;

FIG. 3 is a schematic view depicting a position of probe relative to a specimen surface;

FIG. 5 is a schematic view showing a STM image of a gold film having a position α at which a probe has to be locked; and FIG. 6 is a schematic view illustrating changes in STM images of the gold film under both lock-off and lock-on conditions.

DETAILED DESCRIPTION OF PREFERRED EMBODIMENT

Figure 4A:
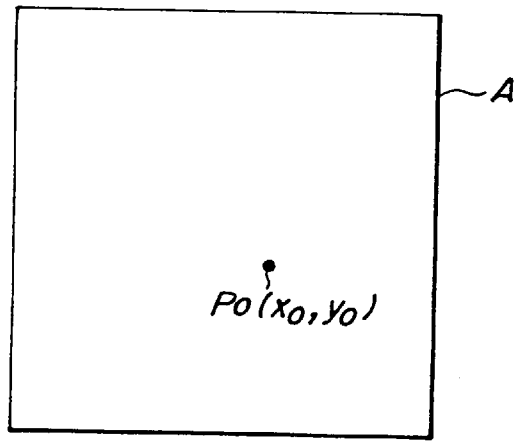
FIGS. 4A–4C are schematic views representing successive steps of the probe locking method according to the invention.

Now an embodiment of the probe locking method according to the invention will be explained in detail. In the present embodiment, the probe locking method is applied to a scanning tunnel microscope (STM).

FIG. 2 is a block diagram showing a general construction of the STM. The STM comprises a main STM unit 1, a STM feedback controller 2 connected to the main STM unit 1, a D/A converter 3 for applying a driving voltage to the main STM unit 1, and a control computer 4 connected to the D/A converter 3. The main STM unit 1 comprises a piezoelectric element 11, a probe 12 secured to the piezoelectric element 11 such that a position of a tip of the probe is controlled by the piezoelectric element 11, and a specimen holder 13. The control computer 4 is programmed to execute the method according to the invention.

For the purpose of clarity, a coordinate system shown in FIG. 3 is provided on a two dimensional specimen surface plane S above a specimen secured on the specimen holder 13. Now it is assumed that the probe 12 has to be locked at a position $P_0(x_0, y_0)$ on the specimen surface plane S as illustrated in FIG. 3. According to the invention, said desired position $P_0(x_0, y_0)$ can be determined at will.

In a first step, the probe 12 is moved to scan a scanning area including said desired position $P_0(x_0, y_0)$ to take a first STM image A as depicted in FIG. 4A. The size of the scanning area should be so large that even though the probe 12 drifts from the position $P_0(x_0, y_0)$ to some extent during a given time period, the probe 12 does not go out of this scanning area.

In a second step, the driving voltage applied to the piezoelectric element 11 is controlled such that the probe 12 is moved into the desired position $P_0(x_0, y_0)$.

Figure 4B:
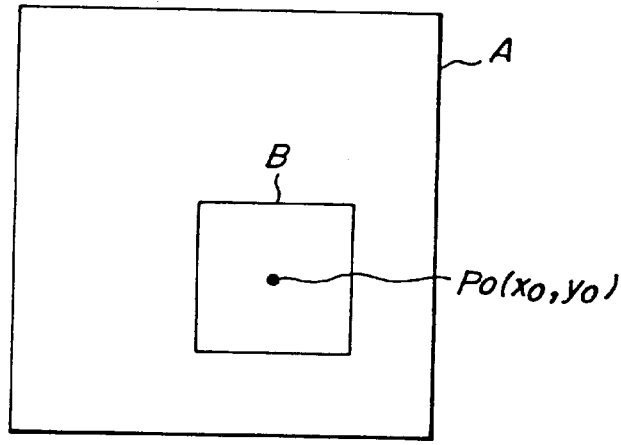

In a third step, a second STM image B is obtained such that the desired position $P_0(x_0, y_0)$ is contained within this second STM image B as illustrated in FIG. 4B. The size of said second STM image B is determined such that the second STM image is included within the first STM image A. In this example, for the sake of simplicity, the second STM image B is taken such that the position $P_0(x_0, y_0)$ is situated at the center of this second STM image B. In the present specification, the position of a STM image is represented by coordinates of its center. Since the second STM image B is obtained such that the position $P_0(x_0, y_0)$ is set at its center, the position of the second STM image B may be expressed by $(x_0, y_0)$.

In a fourth step, the second STM image B is compared with the first STM image A to compute a relative position of the second STM image B to the first STM image A by means of an image registration process. The image registration process may be carried out by any one of various known methods. In the present embodiment, a so-called template matching method is used.

In a fifth step, after the probe 12 is moved into the desired position $P_0(x_0, y_0)$ again by controlling the driving voltage applied to the piezoelectric element 11, the driving voltage is kept unchanged for a predetermined time interval T. This time interval T may be determined experimentally by considering the amount of the probe drift and the size of the second STM image B.

Figure 4C:
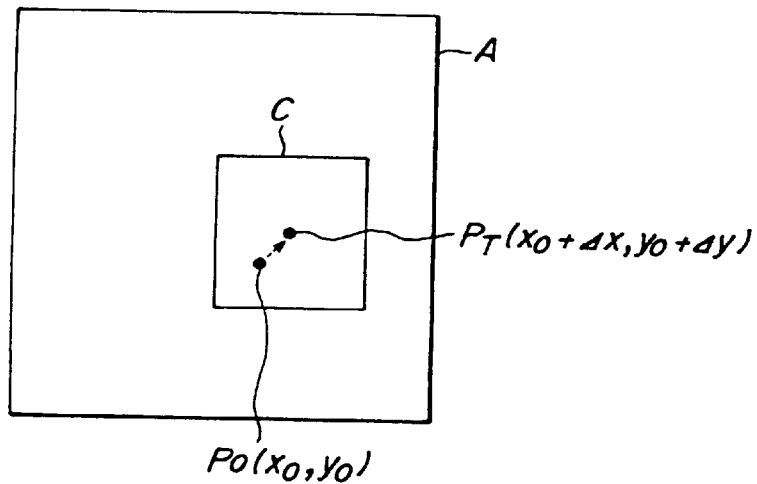

In a sixth step, a third STM image C is obtained such that the third STM image remains within the first STM image A and includes the desired position $P_0(x_0, y_0)$. In the present embodiment, the center of the third STM image C becomes the position $P_T(x_0+\Delta x, y_0+\Delta y)$ at which the probe 11 has arrived after the time interval T and the size of the third STM image C is the same as that of the second STM image B, as shown in FIG. 4C. Therefore, the position of the third STM image C may be expressed by $(x_0+\Delta x, y_0+\Delta y)$. If it is assumed that there is no probe drift, since the driving voltage applied to the piezoelectric element is fixed for the time internal T, the position of the probe 12 is not changed, and therefore the third STM image C becomes identical with the second STM image B. However, in practice, because the probe 12 is moved by the drift during the time interval T, the third STM image C is not identical with the second STM image B.

In a seventh step, the relative position of the third STM image C to the first STM image A is computed by the image registration process. When the position of the first STM image A is represented by $(x_0 y_0)$ as stated above, the position of the third STM image C, that is the position of the probe 12 at this time may be expressed by $(x_0+\Delta x, y_0+\Delta y)$.

In an eighth step, the position $(x_0+\Delta x, y_0+\Delta y)$ of the third image C computed in the seventh step is compared with the position $(x_0, y_0)$ of the second image B computed in the fourth step to derive the amount of the probe drift during the time interval T. Therefore, the amount of the probe drift is expressed by $(+\Delta x, +\Delta y)$.

In a ninth step, the driving voltage applied to the piezoelectric element 11 is controlled in accordance with the thus derived amount of the probe drift $(+\Delta x, +\Delta y)$ to move the probe 12 automatically into the desired position $P_0(x_0, y_0)$.

Afterwards, by repeating the fifth through ninth steps n times, a maximum amount of the probe drift can be limited to an amount of the probe drift during the relatively short time interval T. In this manner, according to the invention, the probe 12 can be locked within a very small area during the very long time interval nT. The time interval T is determined in dependence on respective applications such that a probe drift within each time interval is negligibly small and the repeating number n is determined in accordance with a time period during which the probe has to be locked. In this manner, the probe of the scanning probe microscope can be locked at any desired position on the specimen surface for any desired time period.

Now an effect of the method according to the invention will be demonstrated by the following experimental results. As has been known, a deposited gold film contains grains having a size from several nano-meters to several tens of nano-meters, and the experiment was conducted to lock the probe at such a grain.

FIG. 5 is a STM image of a gold film formed by deposition. The size of this image is 128×128 pixels. Assume that this image is the first image A taken in the first step stated above, and the probe is to be locked at a portion a on a grain. That is to say, the portion a is denoted as a desired position $P_0(x_0,y_0)$.

FIG. 6 shows ten STM images of the specimen taken during the experiment. Each STM image has a size of 32×32 pixels, in which the portion α should be situated at a center of the image if the probe drift does not occur.

In FIG. 6, five STM images on the left hand side were successively taken under a non-lock condition wherein the method according to the invention was not performed, and five STM images on the right hand side were obtained under a lock-on condition in which the method according to the invention was adopted. The uppermost STM images of the lock-on and lock-off correspond to the above explained first image B, wherein the desired position $P_0(x_0,y_0)$. is at a center of the image. The succeeding STM images were taken at the time interval T of two minutes.

In the case of the lock-off, it can be seen that because of the probe drift, the desired portion α has disappeared rapidly from a field of view.

In the case of the lock-on, the probe drift has been compensated for by the method according to the invention, and the desired portion a of the specimen was always within the successive STM images for at least eight minutes during which lock-on had been applied to compensate for the probe drift.

As explained above, in the method according to the invention, the probe drift can be effectively suppressed and the probe of the probe scanning microscope can be locked at any desired position on the specimen surface for a desired time period. Further, the method according to the invention can be performed by simply changing the program of the control computer without adding special circuits or devices.

What is claimed is:

1. A method for locking a probe of a scanning probe microscope at any desired position on a specimen surface plane, the probe being positioned on the specimen surface plane by a driving signal, said method comprising the steps of:

(a) taking a first microscopic image of the specimen by moving the probe to scan a scanning area which includes the desired position;

(b) moving the probe into the desired position by controlling the driving signal;

(c) taking a second microscopic image of the specimen such that said second microscopic image is contained within said first microscopic image;

(d) computing a relative position of said second microscopic image to said first microscopic image by comparing the first and second microscopic images;

(e) keeping the driving signal unchanged for a predetermined time interval after moving the probe into the desired position;

(f) taking a third microscopic image of the specimen such that said third microscopic image is contained within said first microscopic image;

(g) computing a relative position of said third microscopic image to said first microscopic image by comparing the first and third microscopic images;

(h) computing an amount of probe drift during said predetermined time interval by comparing said relative positions of said second and third microscopic images to said first microscopic image with each other;

(i) controlling the driving signal in accordance with said amount of the probe drift to move the probe to the desired position; and (j) repeating said steps (e) to (i) while comparing successively taken microscopic images with the first microscopic image.

2. A method according to claim 1, wherein said second microscopic image is taken such that the desired position becomes a center of the second microscopic image, and said third microscopic image is taken such that a position at which the probe has arrived after said predetermined time interval becomes a center of the third microscopic image.

3. A method according to claim 2, wherein said predetermined time interval is determined experimentally from the amount of the probe drift during said predetermined time interval and the size of the second microscopic image.

4. A method according to claim 3, wherein said first microscopic image is taken such that the desired position is located at a center of the first microscopic image.

5. A method according to claim 4, wherein said steps (d) and (g) of computing the relative positions of said second and third microscopic images to said first microscopic image are carried out by a template matching method.

6. A method according to claim 5, wherein said first microscopic image has a size of 128×128 pixels, and said second and third microscopic image have sizes of 32×32 pixels.

7. A method according to claim 6, wherein said time interval is set to substantially two minutes.

* * * * *